Patented May 29, 1934

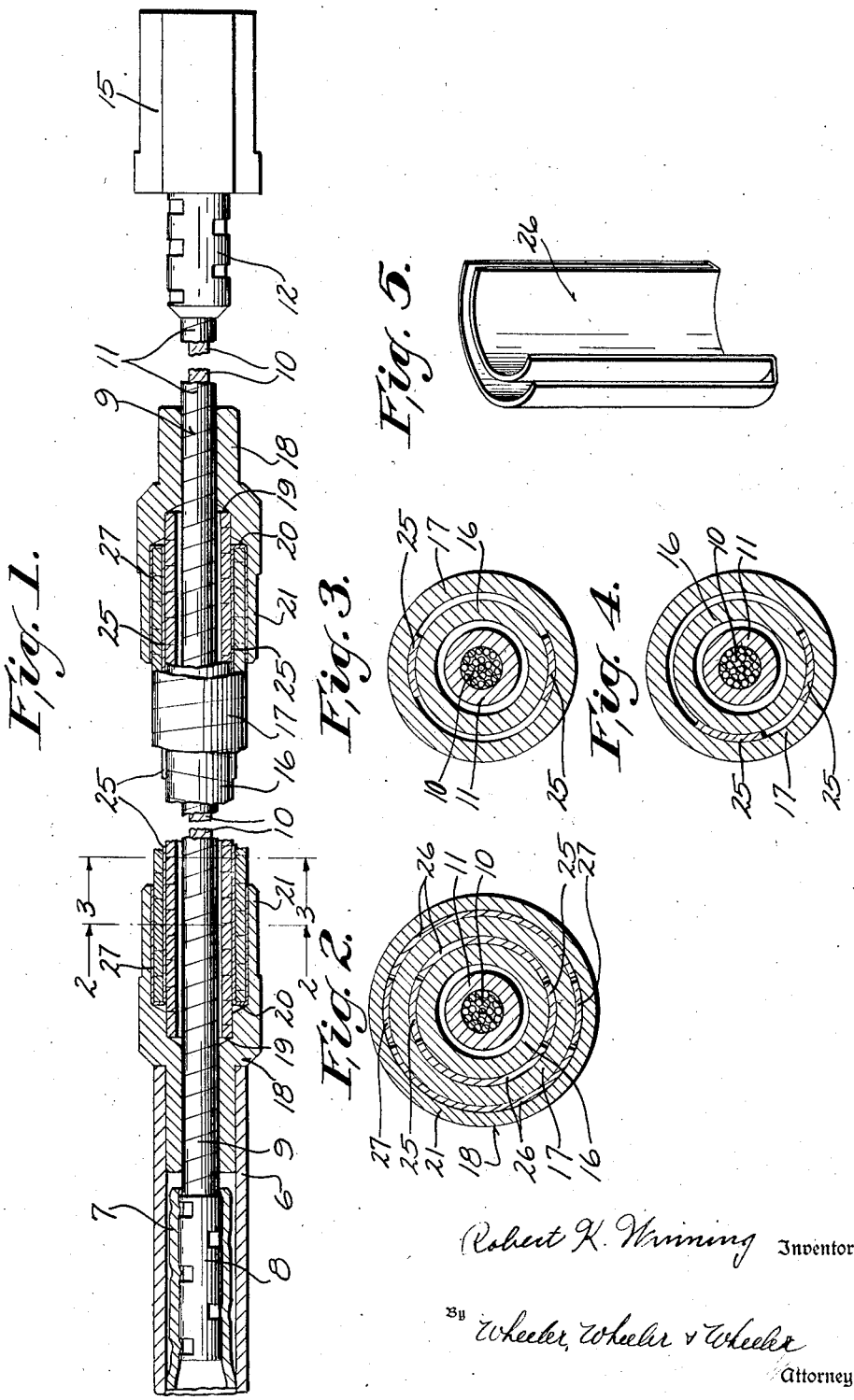

1,960,612

UNITED STATES PATENT OFFICE 1,960,612

FLEXIBLE SHEATH

Robert K. Winning, Wauwatosa, Wis., assignor to Clum Manufacturing Company, Milwaukee, Wis., a corporation of Wisconsin Application February 17, 1932, Serial No. 593,676

5 Claims. (Cl. 64—12)

This invention relates to improvements in flexible sheaths for Bowden wire controls.

It is the object of the invention to provide a novel and improved form of Bowden wire sheath incorporating unstretchable tensile members disposed at opposite sides of the sheath to make it impossible for the sheath to stretch in use.

Particularly in automotive and aviation practice Bowden wires are used for a variety of purposes. Where the adjustment to be made is relatively slight and accuracy is desired, any distension of the sheath will affect the result. By means of the present invention it is possible to operate the control with great accuracy.

It is a further object of the invention to provide a Bowden wire sheath which will not stretch in use and which nevertheless may be formed to take any desired shape. Obviously, the same tensile members relied upon to keep the sheath from stretching might, except for the particular construction herein disclosed, prevent the sheath from flexing at all. In such a case its utility for most purposes would be destroyed. The present invention contemplates the use of tensile members in the form of ribbons or flat wire interposed between concentric helical plies of the sheath at opposite sides thereof and in mutually spaced relation to each other. It will be found that if a sheath incorporating such members is twisted approximately 90° the resulting helical form of the tension elements will permit the sheath to be flexed without destroying the qualities which make it free from distension.

In the drawing:

Fig. 1 is a fragmentary view in longitudinal section of a Bowden wire assembly including a sheath embodying this invention.

Fig. 2 is a view on an enlarged scale taken in section in the plane indicated in 2—2 in Fig. 1.

Fig. 3 is a similar view taken in section in the plane indicated at 3—3 in Fig. 1.

Fig. 4 is a view similar to Fig. 3 showing the tensile members in the position which they may assume when the assembly is twisted for the purpose of enabling it to be flexed.

Fig. 5 is a very much enlarged detail in perspective of a spacing member used between the tensile elements at the ends of the sheath.

Like parts are identified by the same reference characters throughout the several views.

6 represents a housing in which the manually operated plunger 7 is reciprocable in accordance with the disclosure of my co-pending application entitled Control devices, Serial No. 593,675, filed Feb. 17, 1932. In this case the plunger 7 is tubular and the end thereof is deformed into clamping engagement with a clip 8 which anchors the end of the Bowden wire 9. This wire preferably comprises a core 10 upon which is helically wound a ribbon 11 of flat wire. Any desired form of Bowden wire may be used, however. The Bowden wire is connected by means of a similar clip 12 at its far end to the part 15 to be operated thereby.

The intermediate portion of the Bowden wire passes through the sheath which forms the particular subject matter of the present invention. This sheath preferably comprises internal and external plies constituted of concentric layers of helically wound ribbons 16 and 17 of flat wire. An anchorage plug 18 seated within the end of housing 6 is provided with internal shoulders at 19 and 20 against which the respective plies of the sheath are seated as is clearly shown in Fig. 1. At the free end of the sheath is an indentical terminal anchorage 18 corresponding in all respects to that which serves as a closure for the end of housing 6. The portion 21 of each of the anchorage members 18 which engages the sheath is compressed thereon to maintain the parts permanently in assembly.

The respective plies of the sheath comprising helical ribbons 16 and 17 are spaced from each other by the tensile strips 25 which extend longitudinally of the sheath at diametrically opposite sides thereof between its plies. Within each of the anchorage members 18 the tensile elements 25 are definitely spaced by means of the semi-tubular spacing members 26 which are U-shaped in cross-section as shown in Fig. 5 and extend about the inner and outer portions of the outer ply comprising ribbon wire 17. The ends of tensile elements 25 are also bent around the ends of the outer ply 17 of the sheath in order to be directly engaged by the anchorage members 18 as shown at 27.

Although the tensile elements 25 are originally flat and ribbon-like in form, they are forced by the outer helical ply 17 of the sheath to conform to the peripheral contour of the inner ply 16 thereof. Thus in the completed article each of the ribbon-like tensile elements 25 is arcuate in cross-section.

As long as the tensile elements 25 retain the relative positions at diametrically opposite sides of the sheath in which they appear in Fig. 3 it is impossible to bend or flex the sheath in the plane of said elements without destroying it. If however, the sheath is twisted approximately 90°, more or less, it will be found possible to flex the sheath without difficulty in any direction and the two tensile elements 25 will be thrown by the flexing movement toward the inside of the curve formed in the sheath as shown in Fig. 4, in which the lower left hand part of the sheath may be assumed to be at the inside of the curve formed therein.

The distortion produced by this bending operation does not in any way deform the sheath nor affect its ability to resist stretching. A sheath made in accordance with this invention will remain permanently fixed in length and will, nevertheless, retain its adaptability for all uses to which Bowden wires are commonly put.

I claim:

1. A Bowden wire sheath comprising inner and outer plies, a plurality of tension elements confined between said plies and having their ends bent back outside of the outer ply about the end thereof, spacing means interposed between the end portions of the respective tensile elements and clamping means for engaging the respective plies and the reversely bent exposed portions of the tensile elements.

2. A Bowden wire sheath comprising the combination with helically wound means comprising inner and outer plies, the inner ply being the longer, of tension strands of flat wire confined between the respective plies and bent backwardly upon the outer periphery of the outer ply, spacing means interposed between the terminal portions of said tension strands, whereby to maintain said strands normally diametrically opposite and an anchorage device having internal shoulders of different diameter to receive the ends of respective plies and contractedly engaging the reversely bent portions of the tension strands in compression on the respective plies.

3. A Bowden wire sheath comprising the combination with inner and outer plies and tension elements extending longitudinally to an end thereof, of means for spacing said elements comprising concentric semi-tubular parts connected across the end of one of said plies and sleeved thereon at such a spacing as to accommodate the intervening terminal portions of the tensile elements.

4. A Bowden wire sheath comprising the combination with spaced inner and outer plies, of two tension members disposed at opposite sides of the space between said plies and movable to and from each other within said space upon the flexing of said sheath, said members extending longitudinally of said sheath throughout the length of said plies, and means for anchoring the ends of said members to the ends of said plies.

5. A Bowden wire assembly comprising the combination with an inner member and an outer sheathing ply peripherally spaced about said member, of tension elements extending longitudinally of the assembly for the full length thereof and positioned opposite each other within said space, said elements having a substantial width and being curved in cross-section to fit said space and movable within said space to and from each other peripherally about said inner member upon the bending of said assembly.

ROBERT K. WINNING.